Nov. 25, 1958     O. PERALTA     2,861,524
PANCAKE BAKING MACHINE
Filed Feb. 15, 1954
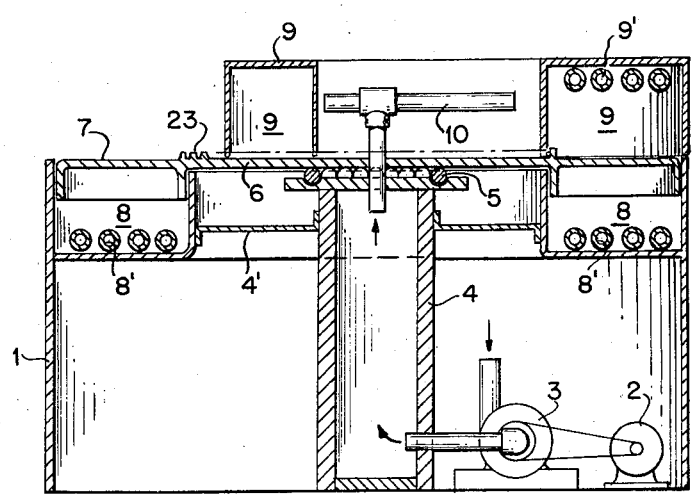
INVENTOR.
OCTAVIO PERALTA
BY
*L. S. Saulsbury*
ATTORNEY

United States Patent Office 2,861,524
Patented Nov. 25, 1958

2,861,524

PANCAKE BAKING MACHINE

Octavio Peralta, Mexico City, Mexico

Application February 15, 1954, Serial No. 410,172

2 Claims. (Cl. 107—60)

The present invention relates to a circular pancake baking machine.

According to the present invention, there is provided a ring-shaped metallic heating surface or pan adapted to receive one or several lines of pancakes, turning at a slow speed, perhaps of one or more turns per minute, the surface or pan being heated from underneath by means of a source of heat within a tunnel or tube whose length has a certain relationship with the heat and the speed of the said pan. The pancake then leaves that zone and passes on to another area which receives the heat directly, that is from above, also in a tunnel or tube, the temperature in all of the baking steps being produced by hot air from the burning of a combustible liquid or gas, or by electricity, the regulation and checking of the heat being controlled by means of a thermostat, if need be.

The entire baking of the pancake takes place during a single turn of the ring. From this it is evident that the temperature applied to the same is related to the speed of movement of the ring-shaped pan, in view of the fact that the heat is applied to a greater or lesser degree automatically as required for the baking of the pancake so that it maintains its porosity and humidity necessary for a good pancake.

In order for the pancake to be taken off after being baked, it reaches a zone where a compressed air current is applied to it between the hot surface and the lower surface of the pancake causing it to become displaced in a radial direction and to be deposited in a receptacle provided for same.

When the pancake is deposited onto the pan, a cover or film is applied to it with the aid of an air gun, or it is coated with a varnishing substance, which may be formed from flour or the like.

Among the principal objects of the present invention are to provide a pancake baking machine that requires little space, that is compact, will withstand all vibrations and changes of temperature, simplicity in construction having been achieved with a minimum number of parts provided so that it becomes more practical and economical as compared to the machines now on the market at the present time, and wherein all operations are carried on automatically and in sequence.

For other objects and a better understanding of the invention, reference may be had to the following detailed description taken in connection with the accompanying drawing, in which the single figure is a vertical sectional view of the heating table.

Referring now to the sectional view of my baking machine shown in the drawing, a circular housing 1 is formed of sheet metal or other similar material which in its interior and lower part has an electrical motor 2 that drives a ventilating fan 3 that is connected to a hollow bearing support or shaft 4 to force compressed air upwardly therethrough. The shaft 4 is carried on the housing 1 by a frame 4' and supports on its upper end ball bearing means 5 on which a supporting table or disc portion 6 turns, the latter holding up an annular pan 7 in a single piece or in sections that run in a channel 8 that is partly covered by an inverted channel cover 9. These channels or tunnels are respectively provided with heating units 8' and 9', such as liquid fuel burners, gas or electricity. The air for shifting and the handling of the pancakes is delivered from shaft 4 to a section of pan 7 outside the channel 9 by a dispensing tube 10 connected to the upper end of shaft 4, which directs a current of air across the surface of pan 7. The tube 10 is diametrically disposed and communicates with the air shaft 4 to deliver a stream of air directed toward the annular pan baking surface 7 emerging from the tunnel 9 for pneumatically shifting the pancakes baked thereon.

Rack 23 on the pan 7 is integral with the pan and is driven in any suitable manner. A fuel tank, not shown, supplies fuel to the burners 8' and 9' of the baking unit.

While various changes may be made in the detail construction, such changes shall be within the spirit and scope of the present invention as defined by the appended claims.

What is claimed is:

1. A circular pancake baking machine comprising in combination a circular metal rotatable table including a disc portion and an annular baking pan having a baking surface and supported on the rim of said disc portion, a motor driven fan below said table, a central hollow air shaft connected to said fan, said air shaft having a horizontal bearing upon which said disc portion rests for rotation of said baking pan, a diametrically disposed tube supported by said shaft and extending above said disc portion and communicating with said air shaft to deliver a stream of air directed toward the baking surface of said pan for pneumatically shifting the pancakes baked thereon.

2. A circular pancake baking machine as defined in claim 1, and having heating tunnels disposed above and below said baking pan and extending throughout certain areas thereof.

References Cited in the file of this patent

UNITED STATES PATENTS

| | | |
|---|---|---|
| 1,229,946 | Gutierrez | June 12, 1917 |
| 2,144,720 | Gibson | Jan. 24, 1939 |
| 2,168,773 | Parr | Aug. 8, 1939 |
| 2,666,399 | Pereyra | Jan. 19, 1954 |